US012789932B2

(12) United States Patent
Ruusunen

(10) Patent No.: US 12,789,932 B2
(45) Date of Patent: Nov. 10, 2026

(54) GOLF BAG CARRIER FOR A BICYCLE AND A BICYCLE

(71) Applicant: FATBAGBIKE OY, Eura (FI)

(72) Inventor: Jari Ruusunen, Eura (FI)

(73) Assignee: FATBAGBIKE OY, Eura (FI)

( * ) Notice: Subject to any disclaimer, the term of this patent is extended or adjusted under 35 U.S.C. 154(b) by 65 days.

(21) Appl. No.: 19/125,343

(22) PCT Filed: Nov. 2, 2023

(86) PCT No.: PCT/FI2023/050614
§ 371 (c)(1),
(2) Date: Apr. 29, 2025

(87) PCT Pub. No.: WO2024/094932
PCT Pub. Date: May 10, 2024

(65) Prior Publication Data

US 2026/0152251 A1 Jun. 4, 2026

(30) Foreign Application Priority Data

Nov. 4, 2022 (FI) .................................. U20220083

(51) Int. Cl.
*B62J 11/05* (2020.01)
*A63B 55/50* (2015.01)
(Continued)

(52) U.S. Cl.
CPC ............... *B62J 11/05* (2020.02); *A63B 55/50* (2015.10); *B62H 1/02* (2013.01); *B62J 7/06* (2013.01)

(58) Field of Classification Search
CPC ... B62J 11/05; B62J 7/06; A63B 55/60; A63B 55/50; B62H 1/02; B62K 3/00; B62B 2202/404
(Continued)

(56) References Cited

U.S. PATENT DOCUMENTS 7,621,548 B2 * 11/2009 Weber ...................... B62J 11/05 280/301
11,235,828 B2 * 2/2022 Chuang ...................... B62J 7/06
(Continued)

FOREIGN PATENT DOCUMENTS

CN 103569278 A * 2/2014

OTHER PUBLICATIONS

CN-103569278 with translation (Year: 2014).*

*Primary Examiner* — Adam J Waggenspack

(57) ABSTRACT

A golf bag carrier (11) for a bicycle (10) is positioned in front of the bicycle's front wheel (18). The golf bag carrier (11) comprises a carrier frame (13) that is mountable to a head tube (17) of a bicycle frame. The carrier frame (13) has support members (19) that allow the front wheel (18) of the bicycle to turn freely from the head tube (17) and thereby allows steering of the bicycle (10). A double leg kickstand (20) is configured to support the bicycle (10) below the front wheel (18). The double leg kickstand (20) has one leg on either side of the front wheel (18) that are configured to pivot near the rotational axis of the front wheel (18). When the double leg kickstand (20) is pivoted backwards for driving the bicycle (10), the kickstand (20) does not hinder pedalling. In one example the extreme ends of the kickstand legs are connected by a stand bar (30) that swivels outside the front wheel perimeter. When the bicycle (10) stops, the cyclist may step on the kickstand (20) and simultaneously pivot both legs and the stand bar (30) below the front wheel (18).

20 Claims, 4 Drawing Sheets

(51) Int. Cl.
*B62H 1/02* (2006.01)
*B62J 7/06* (2006.01)

(58) Field of Classification Search
USPC .................................. 224/412, 419–420, 425
See application file for complete search history.

(56) References Cited

U.S. PATENT DOCUMENTS

| | | | | |
|---|---|---|---|---|
| 11,884,351 | B2 * | 1/2024 | Seguin | B62H 1/00 |
| 2004/0173652 | A1 * | 9/2004 | Busta | B62J 11/05<br>224/433 |
| 2021/0387688 | A1 | 12/2021 | Seguin et al. | |

* cited by examiner

GOLF BAG CARRIER FOR A BICYCLE AND A BICYCLE

BACKGROUND

This disclosure relates to golf bag carriers arranged for bicycles.

Bicycles are suitable for carrying various loads, prior art knows bicycles being equipped with a rear carrier, a bike rack or a front basket. Double leg kickstand enables the bicycle to stand upright when a cyclist gets off the bicycle. Double leg kickstands below the head tube are known from cargo bicycles, having a wide U-shaped tube structure that may be swung out under the bicycle.

In the golf bag carriers according to prior art, the golf bag is located either off-centre in relation to the bicycle frame or high of its centre of gravity, which both make riding the bicycle difficult. In one example, the golf bag carrier is mounted on the rear carrier extending behind the rear wheel.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A golf bag carrier for a bicycle is disclosed hereinafter. The golf bag carrier is positioned in front of the bicycle's front wheel. The golf bag carrier comprises a carrier frame that is mountable to a head tube of a bicycle frame. The carrier frame has support members that allow the front wheel of the bicycle to turn freely from the head tube and thereby allows steering of the bicycle.

In one embodiment, the golf bag carrier comprises a double leg kickstand configured to support the bicycle below the front wheel. The double leg kickstand has one leg on either side of the front wheel that are configured to pivot near the rotational axis of the front wheel.

When the double leg kickstand is pivoted backwards for driving the bicycle, the kickstand does not hinder pedalling. In one example the extreme ends of the kickstand legs are connected by a stand bar that swivels outside the front wheel perimeter. When the bicycle stops, the cyclist may step on the kickstand and simultaneously pivot both legs and the stand bar below the front wheel.

The double leg kickstand provides proper support for the bicycle over uneven or sloped terrain, which is usually found at golf courses. The cyclist, or a golfer, may stop and leave the bicycle with simple movement and proceed to picking up a suitable golf club from the golf bag. The golfer has the golf bag in sight the whole time and may intuitively pick up the correct club as the transition from cycling to walking proceeds while facing forward.

The golf bag carrier is in one example releasable from the bicycle. In one example the frame mount allows the golf bag carrier to be released from the frame mount, by a quick release, quick clamp, a wing nut or a wing screw.

The golf bag carrier provides an improvement for carrying a special-shaped golf bag. Additionally, using a double leg kickstand provides easy transition from the cyclist to the golfer. The golf bag carrier is attached to the bicycle frame by a rigid structure, which allows the bicycle's front wheel to turn freely, while the golf bag placed in the golf bag carrier resides mainly in front of the front wheel.

One advantage is that particularly golf players can ride the bicycle, either a pedal bicycle, an electric bicycle or electrically assisted bicycle, in parts of the golf course terrain intended for the players to move. The bicycle is suitable for carrying one golfer and golf equipment around the golf course with less effort than walking. The golfers may park their bicycle reliably irrespective of its load. The golf is carried along in a balanced way.

Many of the attendant features will be more readily appreciated as they become better understood by reference to the following detailed description considered in connection with the accompanying drawings. The embodiments described below are not limited to implementations which solve any or all the disadvantages of known golf bag carriers.

BRIEF DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples are described and illustrated herein as being implemented in an electric bicycle, they are provided as an example and not a limitation. As those skilled in the art will appreciate, the present examples are suitable for application in a variety of bicycles with electric assistance, electric motors or bicycles without electric assistance.

Throughout the specification, references to 'front' or 'back' or 'forwards' or 'backwards' are to be interpreted in the accepted meaning in the art. For example, when the bicycle goes forwards, it travels in normal bicycle driving position. Throughout the specification, references to 'up' or 'down' or 'upwards' or 'downwards' or 'upper' or 'lower' are to be interpreted in the accepted meaning of the normal bicycle driving position.

Figure 1:
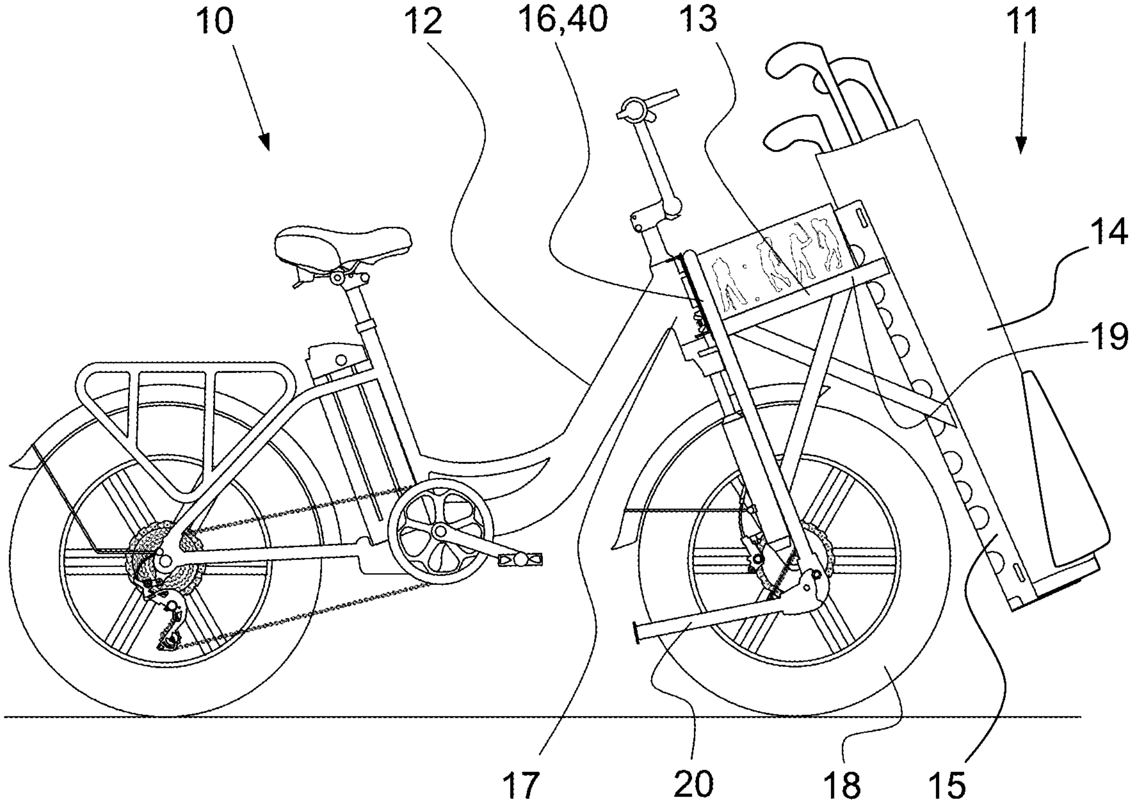
FIG. 1 illustrates schematically a side view of one exemplary embodiment of a bicycle having a golf bag carrier mounted on a bicycle frame.
Figure 2:
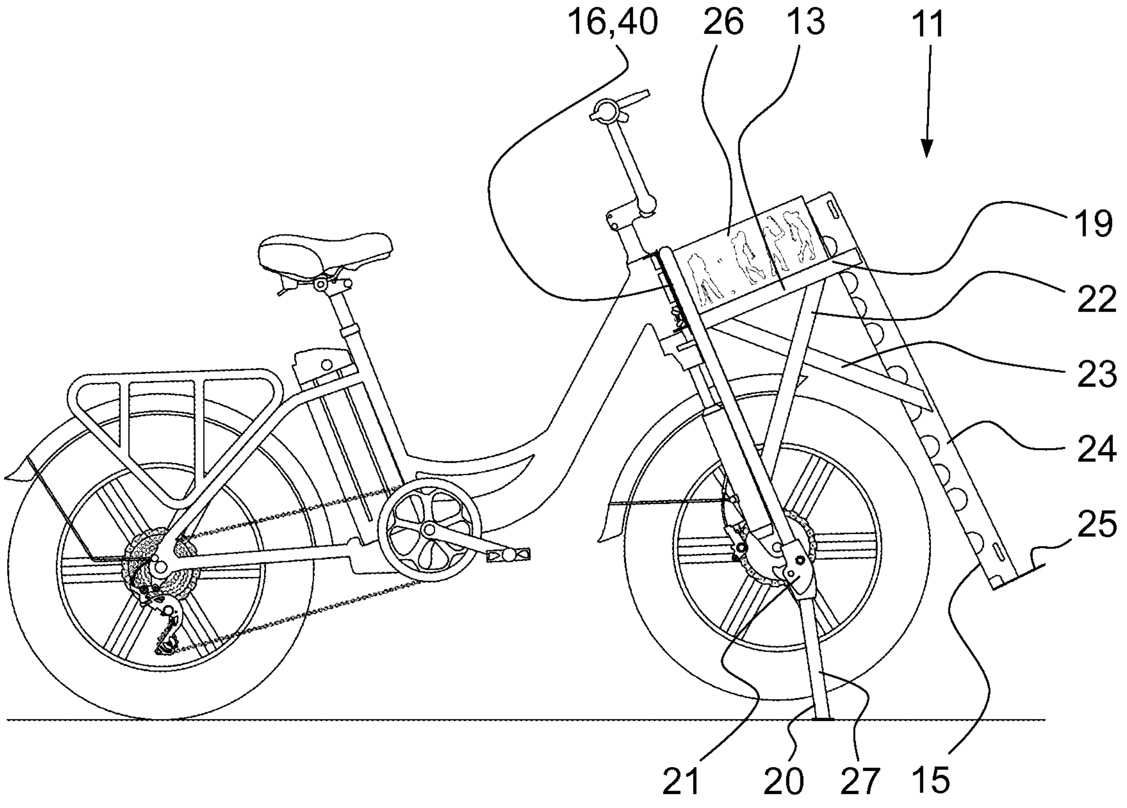
FIG. 2 illustrates schematically the same example, where the bicycle is standing on a kickstand.

FIG. 1 illustrates schematically a side view of one exemplary embodiment of a bicycle 10 having a golf bag carrier 11 mounted on a bicycle frame 12, and the bicycle 10 being in cycling mode. FIG. 2 illustrates schematically the same example, where the bicycle 10 is standing on a kickstand 20.

In this example the bicycle 10 is an electric bicycle and the bicycle frame 12 is a step-through frame, that does not have a top tube. Mounting or dismounting the bicycle with the step-through frame does not require swinging one leg to hip-height, thus making it easier for a golfer.

The golf bag carrier 11 comprises a carrier frame 13 being connected to a golf bag support 15. The golf bag support 15 holds a golf bag 14. The golf bag support 15 is in this example tilted slightly backwards.

In one embodiment, the golf bag support 15 comprises at least one elongated and upstanding bag support member 24 for lying adjacent a golf bag and a forwardly extending bag support member 25 for extending under and supporting said golf bag 14. The golf bag 14 may be secured to the golf bag support 15, for example by a strap. In one example the golf bag support 15 surrounds a lower portion of the golf bag 14, wherein the golf bag 14 may just be lowered onto the golf bag support 15. In one embodiment, the golf bag support 15 is adjustable to accommodate golf bags 14 of various sizes.

The carrier frame 13 is connected to the bicycle frame 12 by a frame mount 16, wherein the frame mount 16 is mounted to a head tube 17 of the bicycle frame 12. The head tube 17 provides support for a fork and a front wheel 18 of the bicycle 10. In one embodiment, the carrier frame 13 is removable from the frame mount 16.

The carrier frame 13 comprises at least one support member 19 that positions the golf bag support 15 at least partially in front of the front wheel 18 of the bicycle 10. In this example the support member 19 is an extension providing distance between the frame mount 16 and the golf bag support 15. The carrier frame 13 allows the bicycle front wheel 18 to turn freely from the head tube 17, as the carrier frame 13 provides sufficient lateral distance in front of the front wheel 18. In one embodiment, golf bag support 15 is in front of the front wheel 18 and in an upright position tilted towards the head tube 17. In the tilted position, the upper portion of the golf bag support 15 may be at least partially above the front wheel 18, while the lower portion is in front of the front wheel 18.

In the example, the carrier frame 13 comprises an accessory basket 26 in front of the handlebar. The accessory basket 16 may be used to carry golf accessories, drinks or other small items.

In one embodiment, the support member 19 comprises additional structure to provide stiffness for the golf bag support 15. In one embodiment, the support member 19 comprises one first diagonal member 23 on both sides of the front wheel 18, reaching from the frame mount 16 to a lower portion of the golf bag support 15. In one embodiment, the support member 19 comprises one second diagonal member 22 on both sides of the front wheel 18. The second diagonal member 22 is connected between a lower portion of the frame mount 16 and an upper portion of the golf bag support 15. In one embodiment, the second diagonal member 22 is connected between the lower portion of the frame mount 16 and a front upper portion of the support member 19. The first diagonal member 23 and/or the second diagonal member 22 are both implemented in the example, thereby minimizing torsional loads exerted on the golf bag support 15.

Figure 3:
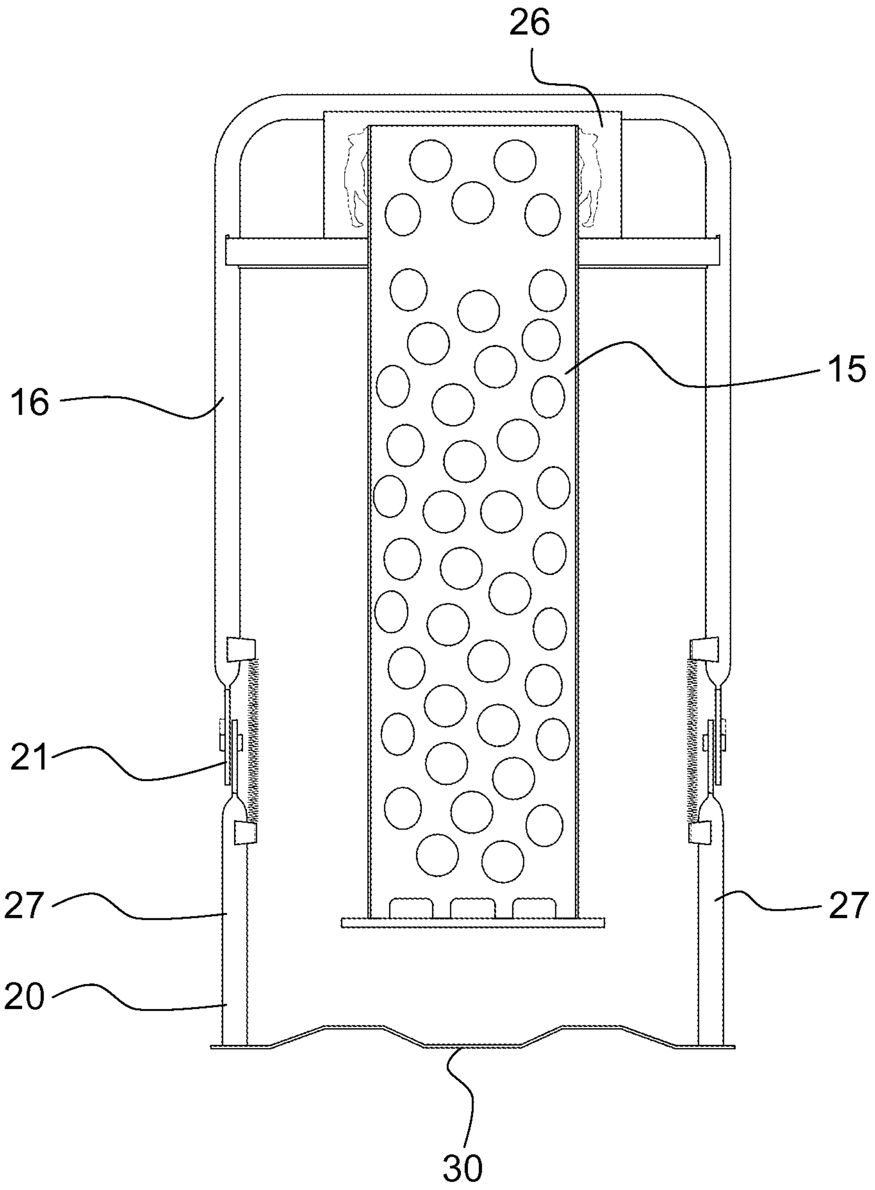
FIG. 3 illustrates schematically a front view of the golf bag carrier.

FIG. 3 illustrates schematically a front view of the golf bag carrier 11, without the bicycle 10. In one embodiment, the golf bag carrier 11 comprises a double leg kickstand 20, having one leg on either side of the front wheel 18. The golfer may deploy the kickstand 20 by a forward motion, when stepping off the bicycle 10. In this example, the double leg kickstand 20 is part of the frame mount 16. The frame mount 16 extends from the head tube 17 towards the front wheel hub, where the double leg kickstand 20 is connected.

Various alternatives for combining the double leg kickstand 20 and the golf bag support 15 are possible. In one embodiment, the golf bag support 15 is removable from the frame mount 16, leaving the combination of the frame mount 16 and the double leg kickstand 20 mounted to the bicycle 10. In one embodiment, the golf bag support 15 and the double leg kickstand 20 are removable from the frame mount 16, where the frame mount 16 provides only means for fixing other functions to the bicycle 10 head tube 17.

The legs 27 of the kickstand 20 pivot near a front wheel hub, by a hinge 21. In this example, the kickstand 20 is arranged outside the front wheel hub. In one embodiment, the kickstand 20 is connected to the front wheel hub and turns along the front wheel 18.

The kickstand 20 flips down and lifts the front wheel 18 off the ground when in use. The kickstand 20 mechanism may comprise a spring that is stretched when the kickstand 20 is partway deployed and less stretched when it is all the way deployed.

In one embodiment, the extreme ends of opposite kickstand legs 27 are connected by a stand bar 30 that swivels outside the front wheel 18 perimeter. The stand bar 30 may be a straight bar, or as in the example, have bends that provide improved connection to terrain while keeping away from cycle 10 components as well as cyclist toes and knees. The bends also increase the stiffness of the bar.

Figure 4:
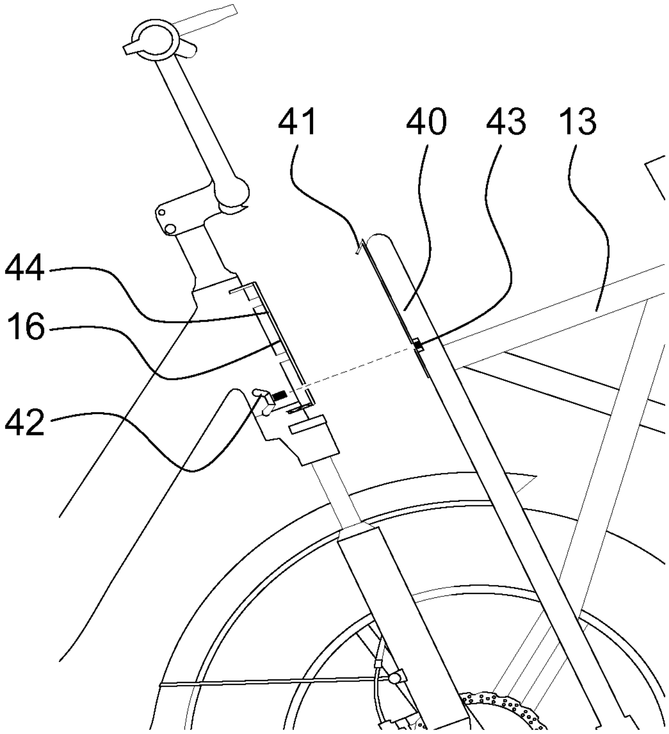
FIG. 4 illustrates schematically a side view of one exemplary embodiment for mounting the carrier frame to the frame mount.

FIG. 4 illustrates schematically a side view of one exemplary embodiment for mounting the carrier frame 13 to the frame mount 16. In this embodiment, the frame mount 16 comprises a mounting plate 44 that is fixed to the head tube 17 of the bicycle 10. The mounting plate 44 may be removable from the head tube 17. In one embodiment, the bicycle 10 comprises threads or other means for mounting accessories to the head tube, and the mounting plate 44 is mounted to said mounting means. A vertical support frame 40 may be part of the frame mount 16 or part of the carrier frame 13. In the present example, the vertical support frame 40 is part of the carrier frame 13. In one embodiment, the carrier frame 13 comprises a hanger hook 41. The hanger hook 41 may be part of a bent metal plate or a separate hook fixed to the carrier frame 13. The hanger hook 41 is configured to support the carrier frame 13 when placed onto the frame mount 16.

In one embodiment, the carrier frame 13, and the golf bag support 15 are connected to the frame mount 16 by a wing screw 42 as illustrated in FIG. 4. The carrier frame 13 is hung on the hanger hook 41, that aligns a hole at the frame mount 16 and a female thread 43 at the vertical support frame 40. The wing screw 42 is tightened into the female thread 43, securing the golf bag carrier 11 into the bicycle 10.

Figure 5:
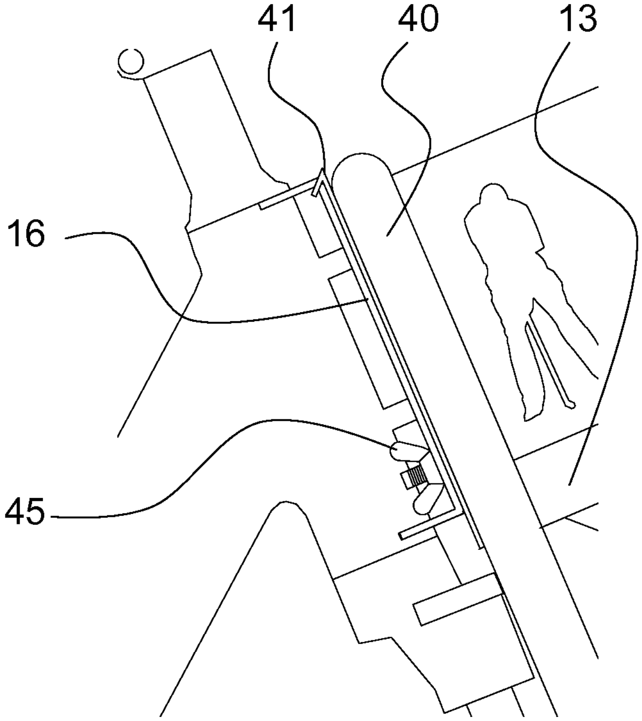
FIG. 5 illustrates schematically a side view of one exemplary embodiment for mounting the carrier frame to the frame mount.

In one embodiment, the carrier frame 13, and the golf bag support 15 are connected to the frame mount 16 by a wing nut 45 as illustrated in FIG. 5. In this example, the vertical support frame 40 comprises a screw that passes through the frame mount 16, when the carrier frame 13 is hung on the hanger hook 41 and the carrier frame 13 leans towards the frame mount 16. The wing nut 45 may be used to tighten the connection and secure the golf bag carrier 11 into the bicycle 10. In one embodiment, the carrier frame 13, and the golf bag support 15 are connected to the frame mount 16 by a quick clamp. The quick clamp may release the carrier frame 13 from the frame mount 16 by simple movement.

In one embodiment, the carrier frame 13 is connected to a structure comprising the vertical support frame 40, the frame mount 16 and the kickstand 20. In one embodiment, the carrier frame 13 is connected to the vertical support frame 40, wherein the kickstand 20 is a double leg kickstand connected to a rear wheel hub, near a bottom bracket or anywhere behind the bottom bracket.

In one aspect the bicycle 10 comprises the golf bag carrier 11. In one aspect the golf bag carrier 11 is an accessory that may be installed onto the bicycle.

One aspect discloses a bicycle equipped with a two-legged kickstand, which bicycle includes a package carrier. The package carrier includes two parallel package supports which are fastened to the frame tubes of the two-legged kickstand. These frame tubes form a closed rectangular loop when fastened to the frame of the bicycle. At the bottom end of the frame tubes, at a distance from the bottom end, there are hinge points from which the bottom part is turned up when wanting to remove the support. Of the supports, at least one has fastening links which ensure the resting of the auxiliary carrier 5 on the supports. The supports are most preferably manufactured of pipe by bending.

The auxiliary carrier is arranged for a golf player's equipment bag, i.e. "golf bag". Its shape is arranged to receive all most common golf equipment bags. They can be easily secured to rest, e.g. by means of a binding strap, on the auxiliary carrier which comprises a bottom plate and bars directed upwards from its edges. Counterparts are pushable on top of the supports, the shape of which counterparts is that of partially open flat sleeves which are dimensioned of their distance based on the distance of the supports.

The bicycle may comprise the auxiliary carrier without the golf equipment bag. The counterparts of the auxiliary carrier are pushed on top of the supports. However, the auxiliary carrier is located in front of the bicycle such that the front wheel can operate in a normal way and the auxiliary carrier does not touch the ground. When the package carrier, the two-legged kickstand and the auxiliary carrier are located centrally and symmetrically in relation to the frame of the bicycle, the bicycle runs steadily and its steering is light because, when turning, there is no need to turn the front load to the side by the handlebars.

The auxiliary carrier is quickly removable, whereby the presented bicycle becomes a standard bicycle. The auxiliary carrier is fastenable to a package carrier and installable to the frame of a bicycle. Therein, a golf equipment bag is kept parallel with the bicycle, due to which, the balance of the bicycle remains and, when stopping, the bicycle stays steadily in the upright position by means of the kickstand. An electric fat bike with a low frame, equipped with this carrier is suited for the golf player. This invention facilitates the golf hobby of slightly physically challenged persons still providing physical activity for golfers.

An auxiliary carrier fastenable to a package carrier in front of the frame of a bicycle is equipped with a two-legged kickstand, characterised in that the auxiliary carrier is attached with said frame and said package carrier into a uniform structure, which structure allows the bicycle's steering front wheel to turn freely alone, and that the auxiliary carrier is mainly located in front of the front wheel and intended and arranged of its shape for carrying a golf player's equipment bag, whereby the auxiliary carrier comprises a bottom plate and bars directed upwards from its edges to support the tubular equipment bag tilted backwards. In one embodiment, the auxiliary carrier is fastenable to the package carrier by means of quick fastening, such as by means of counterparts pushable on top of supports included in the package carrier. In one embodiment, said uniform structure is fastened to the frame of the bicycle by means of the frame of a two-legged kickstand.

Alternatively, or in addition, a golf bag carrier for a bicycle is disclosed herein. The golf bag carrier comprises a carrier frame comprising a golf bag support, wherein the carrier frame is connectable to a bicycle frame by a frame mount. The carrier frame is connectable to a head tube of the bicycle frame; the carrier frame comprises at least one support member that extends the golf bag support to be positioned at least partially in front of the front wheel of the bicycle and allows the bicycle front wheel to turn freely from the head tube, when the golf bag carrier is connected to the bicycle frame. In one embodiment, the golf bag support is mainly located in front of the front wheel and in an upright position tilted towards the head tube. In one embodiment, the golf bag support comprises at least one elongated and upstanding bag support member for lying adjacent a golf bag and a forwardly extending bag support member for extending under and supporting said golf bag. In one embodiment, the support member comprises one first diagonal member on both sides of the front wheel, reaching from a frame mount to a lower portion of the golf bag support. In one embodiment, the support member comprises one second diagonal member on both sides of the front wheel, reaching from a lower portion of the frame mount to an upper portion of the golf bag support or to a front upper portion of the support member. In one embodiment, the golf bag carrier comprises a double leg kickstand, having one leg on either side of the front wheel. In one embodiment, the legs of the kickstand pivot near a front wheel hub. In one embodiment, the extreme ends of the legs are connected by a stand bar that swivels outside the front wheel perimeter. In one embodiment, the double leg kickstand is part of the frame mount. In one embodiment, the golf bag support and the double leg kickstand are removable from the frame mount. In one embodiment, the golf bag support is removable from the frame mount. In one embodiment, the golf bag support is connected to the frame mount by a wing nut, a wing screw or a quick clamp.

Alternatively, or in addition, a bicycle having a golf bag carrier is disclosed herein. A carrier frame comprises a golf bag support, wherein the carrier frame is connected to a bicycle frame by a frame mount. The carrier frame is connected to a head tube of the bicycle frame; the carrier frame comprises at least one support member that extends the golf bag support to be positioned at least partially in front of the front wheel of the bicycle and allows the bicycle front wheel to turn freely from the head tube. In one embodiment, the golf bag support is completely or mainly located in front of the front wheel and in an upright position tilted towards the head tube. In one embodiment, the golf bag support comprising at least one elongated and upstanding bag support member for lying adjacent a golf bag and a forwardly extending bag support member for extending under and supporting said golf bag. In one embodiment, the support member comprises one first diagonal member on both sides of the front wheel, reaching from a frame mount to a lower portion of the golf bag support. In one embodiment, the support member comprises one second diagonal member on both sides of the front wheel, reaching from a lower portion of the frame mount to an upper portion of the golf bag support or to a front upper portion of the support member. In one embodiment, the bicycle comprises a double leg kickstand, having one leg on either side of the front wheel. In one embodiment, the legs of the kickstand pivot near a front wheel hub. In one embodiment, the extreme ends of the legs are connected by a stand bar that swivels outside the front wheel perimeter. In one embodiment, the bicycle is an electric bicycle.

Any range or device value given herein may be extended or altered without losing the effect sought.

Although at least a portion of the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A golf bag carrier for a bicycle, comprising:

a carrier frame comprising a golf bag support, wherein the carrier frame is connectable to a bicycle frame by a frame mount;

the carrier frame is connectable to a head tube of the bicycle frame;

the carrier frame comprises at least one support member that extends the golf bag support to be positioned at least partially in front of the front wheel of the bicycle and allows the bicycle front wheel to turn freely from the head tube, when the golf bag carrier is connected to the bicycle frame.

2. A golf bag carrier according to claim 1, wherein the golf bag support is mainly located in front of the front wheel and in an upright position tilted towards the head tube.

3. A golf bag carrier according to claim 1, the golf bag support comprising at least one elongated and upstanding bag support member for lying adjacent a golf bag and a forwardly extending bag support member for extending under and supporting said golf bag.

4. A golf bag carrier according to claim 1, wherein the support member comprises one first diagonal member on both sides of the front wheel, reaching from a frame mount to a lower portion of the golf bag support.

5. A golf bag carrier according to claim 4, wherein the support member comprises one second diagonal member on both sides of the front wheel, reaching from a lower portion of the frame mount to a front portion of an upper portion of the golf bag support or to a front upper portion of the support member.

6. A golf bag carrier according to claim 1, comprising a double leg kickstand, having one leg on either side of the front wheel.

7. A golf bag carrier according to claim 6, wherein the legs of the kickstand pivot near a front wheel hub.

8. A golf bag carrier according to claim 7, wherein the extreme ends of the legs are connected by a stand bar that swivels outside the front wheel perimeter.

9. A golf bag carrier according to claim 6, wherein the double leg kickstand is part of the frame mount.

10. A golf bag carrier according to claim 6, wherein the golf bag support and the double leg kickstand are removable from the frame mount.

11. A golf bag carrier according to claim 1, wherein the golf bag support is removable from the frame mount.

12. A golf bag carrier according to claim 1, wherein the golf bag support is connected to the frame mount by a wing nut, a wing screw or a quick clamp.

13. A bicycle having a golf bag carrier, comprising:

a carrier frame comprising a golf bag support, wherein the carrier frame is connected to a bicycle frame by a frame mount;

the carrier frame is connected to a head tube of the bicycle frame;

the carrier frame comprises at least one support member that extends the golf bag support to be positioned at least partially in front of the front wheel of the bicycle and allows the bicycle front wheel to turn freely from the head tube.

14. A bicycle according to claim 13, wherein the golf bag support is mainly located in front of the front wheel and in an upright position tilted towards the head tube.

15. A bicycle according to claim 13, the golf bag support comprising at least one elongated and upstanding bag support member for lying adjacent a golf bag and a forwardly extending bag support member for extending under and supporting said golf bag.

16. A bicycle according to claim 13, wherein the support member comprises one first diagonal member on both sides of the front wheel, reaching from a frame mount to a lower portion of the golf bag support.

17. A bicycle according to claim 16, wherein the support member comprises one second diagonal member on both sides of the front wheel, reaching from a lower portion of the frame mount to an upper portion of the golf bag support or to a front upper portion of the support member.

18. A bicycle according to claim 13, comprising a double leg kickstand, having one leg on either side of the front wheel.

19. A bicycle according to claim 18, wherein the legs of the kickstand pivot near a front wheel hub.

20. A bicycle according to claim 19, wherein the extreme ends of the legs are connected by a stand bar that swivels outside the front wheel perimeter.

* * * * *